(12) United States Patent
Prunet et al.

(10) Patent No.: US 9,947,189 B2
(45) Date of Patent: Apr. 17, 2018

(54) HOME AUTOMATION DEVICE FOR MONITORING THE MOVEMENT OF A SWINGING WING AND METHOD FOR ENHANCING THE RELIABILITY OF SUCH A DEVICE

(71) Applicant: MYFOX, Labege (FR)

(72) Inventors: Jean-Marc Prunet, Paris (FR); Jean-Yves Fourniols, Quint Fonsegrivtes (FR)

(73) Assignee: MYFOX, Labege (FR)

( * ) Notice: Subject to any disclaimer, the term of this patent is extended or adjusted under 35 U.S.C. 154(b) by 119 days.

(21) Appl. No.: 14/905,650

(22) PCT Filed: Jun. 16, 2014

(86) PCT No.: PCT/FR2014/051475
§ 371 (c)(1),
(2) Date: Jan. 15, 2016

(87) PCT Pub. No.: WO2015/007969
PCT Pub. Date: Jan. 22, 2015

(65) Prior Publication Data
US 2016/0163166 A1    Jun. 9, 2016

(30) Foreign Application Priority Data

Jul. 17, 2013  (FR) ..................... 13 57028

(51) Int. Cl.
*G08B 13/08* (2006.01)
*G08B 13/24* (2006.01)
*H04L 12/28* (2006.01)

(52) U.S. Cl.
CPC ......... *G08B 13/08* (2013.01); *G08B 13/2494* (2013.01); *H04L 12/2838* (2013.01);
(Continued)

(58) Field of Classification Search
CPC ........ E05Y 2400/326; E05Y 2900/132; G08B 13/08; G08B 13/2494; H04L 12/2838; H04L 2012/2841
(Continued)

(56) References Cited

U.S. PATENT DOCUMENTS 6,310,549 B1   10/2001   Loftin et al.
6,940,405 B2    9/2005   Script et al.
(Continued)

FOREIGN PATENT DOCUMENTS

DE   10 2008 022276 A1   11/2009
JP       2006 241972 A    9/2006
WO      2007/048908 A1    5/2007

OTHER PUBLICATIONS

International Search Report, dated Oct. 6, 2014, from corresponding PCT application.

*Primary Examiner* — Ojiako Nwugo
(74) *Attorney, Agent, or Firm* — Young & Thompson

(57) ABSTRACT

A home automation device includes a movement detector (20) including an accelerometer and a magnetometer, and a processing unit for processing the signals supplied by the accelerometer and the magnetometer. At least one memory stores a reference orientation of the detector. The processing unit, on detection of a reference event from the acceleration signals, is capable of replacing the reference orientation with the instantaneous orientation of the detector.

20 Claims, 3 Drawing Sheets

Figure 3:
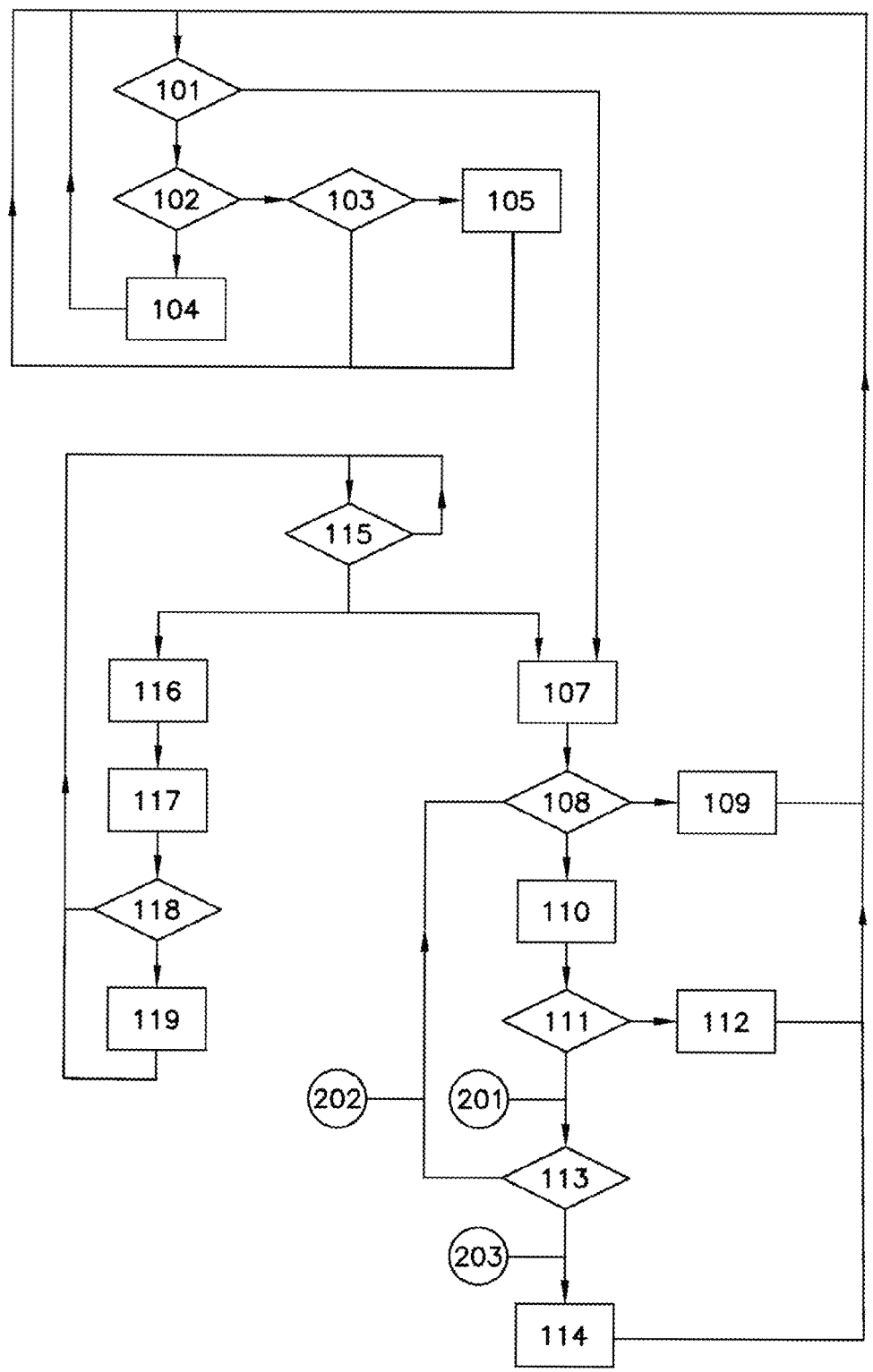

(52) U.S. Cl.
CPC ... *E05Y 2400/326* (2013.01); *E05Y 2900/132* (2013.01); *H04L 2012/2841* (2013.01)

(58) Field of Classification Search
USPC .................................................. 340/547, 546
See application file for complete search history.

(56) References Cited

U.S. PATENT DOCUMENTS

| | | | |
|---|---|---|---|
| 2008/0234533 A1* | 9/2008 | Vollum | G01C 21/20 600/9 |
| 2010/0019902 A1* | 1/2010 | Mullet | G08B 13/08 340/546 |
| 2013/0000406 A1 | 1/2013 | Parsadayan et al. | |

\* cited by examiner

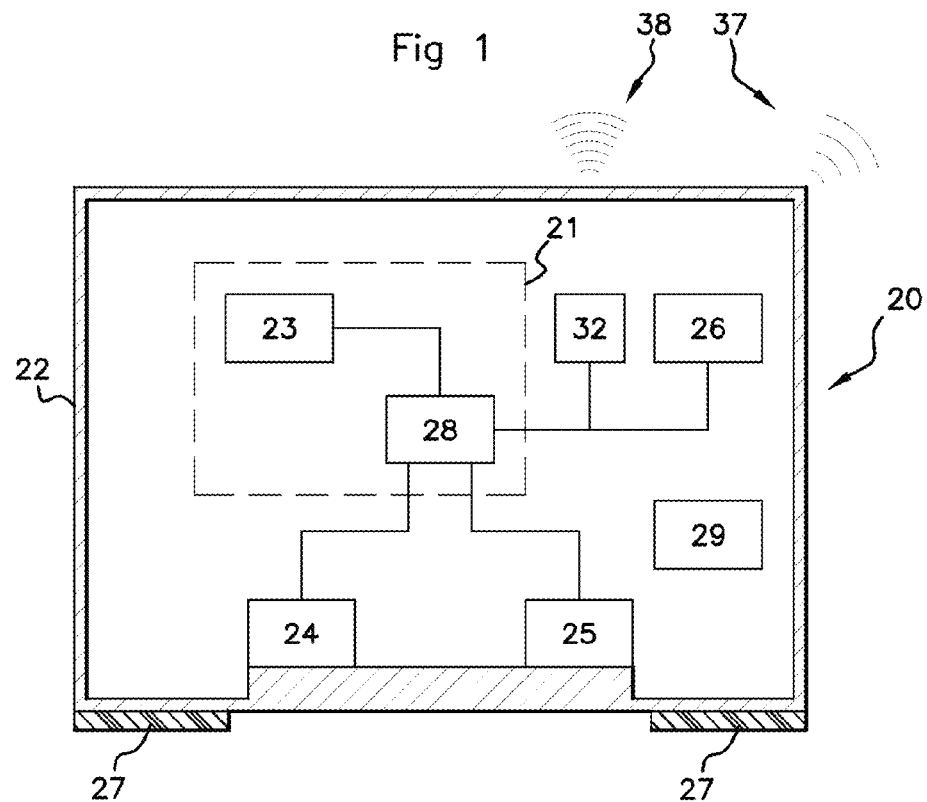
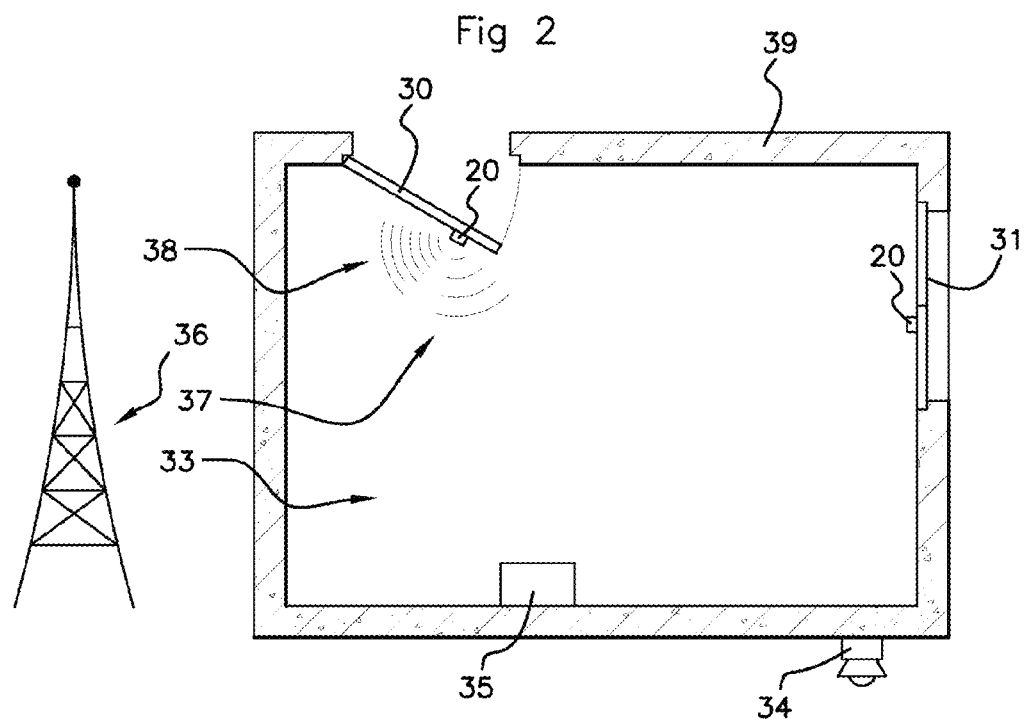

HOME AUTOMATION DEVICE FOR MONITORING THE MOVEMENT OF A SWINGING WING AND METHOD FOR ENHANCING THE RELIABILITY OF SUCH A DEVICE

The invention relates to a home automation device enabling reliable detection of the movement of a wing relative to a frame fixed in the terrestrial reference system. The invention enables in particular monitoring of the position of a swinging wing.

Monitoring the movement of a wing, that is to say monitoring its position and/or movement and/or acceleration (including shocks), is essential in a home automation device, and in particular in an alarm device against intrusions and break-ins. It is especially desired to be informed of the position and/or movement of a wing relative to its reference orientation—generally a closed position on a frame.

Alarm systems are known such as those proposed by U.S. Pat. No. 6,940,405 which combine a magnetic field sensor with an inertial sensor. Thus, the movement of a pivoting object can be detected either by detecting an instantaneous acceleration of the object corresponding to an opening and/or shocks or, in the absence of detection of an abnormal acceleration by the inertial sensor (that is to say in the presence of a slow movement of the object), by detecting a change in orientation of the object through the magnetic field sensor.

However, such known devices do not enable the instantaneous position of a swinging wing relative to a frame to be known. In fact, the magnetic field sensors are generally unreliable and are influenced by many magnetic interference fields. Such a sensor further has significant inaccuracies which result in deviations over time in the tracking of the position of the wing and prevent determination of the instantaneous position thereof. But such information can be useful in many applications.

It can be obtained by more complicated and also much more costly and bulky sensors. However, such detectors are not suitable for a home automation device in which the detectors should be as discreet and light as possible, while remaining at a reasonable cost and with low energy consumption so as to be autonomous.

The invention therefore aims to overcome these disadvantages.

The invention aims to provide a home automation device for reliably determining whether a monitored wing is being moved or has been moved relative to a reference orientation.

The invention aims in particular to provide a home automation device for determining whether a wing is open or closed.

The invention also aims to provide such a device which takes up little space, is inexpensive, and yet reliable.

The invention aims to provide a device which consumes little energy, and which is therefore energetically autonomous.

The invention further aims to provide a device which can monitor a plurality of swinging wings, in all kinds of places.

The invention is also aimed at a method for enhancing the reliability of a home automation device according to the invention.

The invention therefore relates to a home automation device comprising:
at least one movement detector for detecting movement of a wing rotatable about an axis relative to a frame fixed in a terrestrial reference system, said movement detector comprising:
a housing adapted to be securable to the wing,
an accelerometer fixed to the housing and adapted to provide signals, named acceleration signals, representative of the acceleration of the housing along at least one fixed direction of the housing relative to the frame,
a magnetometer fixed to the housing and adapted to provide signals, named orientation signals, representative of the instantaneous orientation of at least one fixed direction of the housing relative to an Earth's local magnetic field,
a processing unit for processing the signals provided by the accelerometer and by the magnetometer,
characterised in that:
the processing unit comprises at least one memory and is adapted to store therein predetermined data, named reference orientation data, representative of an orientation value, named reference orientation, of the housing relative to the Earth's local magnetic field,
the processing unit is adapted to be able to identify a predetermined event, named reference event, at least from the acceleration signals,
the processing unit is adapted, on detection of a reference event, to replace the reference orientation data with data representative of the instantaneous orientation of the housing.

Thus, the instantaneous orientation of the housing on the occurrence of the reference event becomes the new reference orientation.

The invention therefore enables resetting of the instantaneous orientation of the movement detector. Thus, if the orientation provided by the magnetometer varies over time or if the calculation carried out based on the signals delivered by the magnetometer and enabling the instantaneous orientation of the housing to be obtained accumulates errors over time—especially during successive movements of the monitored wing on which the movement detector is mounted—the reference orientation is reset on detection of a known predetermined event. If such a predetermined event occurs regularly compared with the number of movements of the monitored wing, the measurement of the instantaneous orientation of the wing is relatively accurate because it is regularly reset to a certain value.

Advantageously a predetermined event corresponding to the closing of the wing on its frame is chosen. For, the closed position on a frame is a known exact position fixed in time of the door relative to a frame. Moreover, in particular in a surveillance system, it is desired to know the position of each wing relative to its closed position. By virtue of a detector according to the invention, it is possible to measure the orientation of the wing relative to the frame and reset its reference orientation by detecting its closing on the frame.

Thus, the invention makes it possible to obtain, for the first time, a detector which is reliable, inexpensive and takes up little space. For, the invention makes it possible to use a medium quality magnetometer whose orientation measurements change over time and/or in the course of successive movements, while obtaining results sufficient for a home automation system, in particular passive monitoring (personal safety, for example), active monitoring (safety of property through an alarm system, for example), control of household electrical objects, energy and air conditioning management, communication between devices and user(s), dependency management, etc.

The invention makes it possible in particular to use a magnetometer while overcoming the problems of detection associated with minimal or extreme variations of orientation of the Earth's local magnetic field. It makes it possible in particular to use a magnetometer to detect the orientation of a wing despite the variations of the Earth's local magnetic field induced by sources of electromagnetic interference, such as metal parts, domestic appliances, electrical circuits, magnets, etc.

The invention therefore provides a home automation device which makes it possible to know the instantaneous orientation of a wing. Such information can be very useful, for example, in an alarm system, upon activation of an active monitoring mode. The invention thus makes it possible to detect that a wing (door or window) has remained open upon the activation of the alarm system.

Thus, the invention makes it possible not only to detect the slow movement of a monitored wing, but also to know its instantaneous orientation reliably—or at least the open or closed state.

Through the combination of an accelerometer and a magnetometer, a detector according to the invention enables effective detection of any kind of break-in or theft. For, the accelerometer does not enable (or only poorly enables) detection of the slow movements but does enable effective detection of the rapid movements and shocks. On the other hand, although the shocks and abrupt changes detected via the magnetometer are filtered for technical reasons, it enables effective detection of slow variations in orientation.

Advantageously and according to the invention, the processing unit is adapted to be able to identify a predetermined reference event from the acceleration signals and the orientation signals.

To this end, the processing unit is programmable and advantageously comprises digital data processing means (a microprocessor or a microcontroller, for example) and means for storing instructions in the form of digital data (e.g. a read-only memory). The processing unit is in particular a computing device for processing digital data.

More particularly, the processing unit is programmed to perform operations—especially comparisons—from the signals provided to it and values stored in a memory, operations which by their nature and logical sequence correspond to the identification of a predetermined reference event.

The processing unit is in particular programmed to perform operations on the angular norms and the movement energy norms corresponding to the signals it receives.

Thus, the return to a predetermined position is advantageously detected by the processing unit when data representative of a shock is provided to it by the accelerometer (corresponding to a closing on a frame). However, such a shock can sometimes occur in orientations remote from the reference orientation: for example in the case of a door in the open position against a doorstop.

Although possibly inaccurate, orientation measurements provided by the magnetometer allow the processing unit to select the events detected from the accelerometer signals. Thus, for example, the detection of a shock on a door outside a predetermined range of orientation values situated around the reference orientation cannot be due to the closing of the door.

Therefore, advantageously and according to the invention, in a first embodiment, the processing unit is adapted to be able to identify a reference event in which:
    an acceleration energy of the movement detector is greater than a predetermined energy value, and
    the orientation signals are representative of an instantaneous orientation of the detector which is, in absolute value, within a predetermined range of orientations comprising at least the reference orientation.

The acceleration energy is determined by the processing unit from the acceleration signals delivered by the accelerometer.

The predetermined energy value and the predetermined range of orientations are stored as digital data in a memory.

The processing unit is thus adapted to be able to detect the occurrence of a particular event giving rise to a shock for orientations of the wing close to its reference orientation relative to a frame. Only the shocks of a wing on its frame which can only occur in an uncertainty range around the reference orientation are thus selected by the processing unit in the context of the resetting of said reference orientation.

Advantageously, in this first embodiment, a reference event corresponds to:
    an acceleration of the housing of said detector corresponding to a shock transmitted to said housing, and
    an orientation of the detector within a predetermined range of orientations of 2° to 5° around the reference orientation.

The predetermined energy value is a stored threshold value. In practice, the processing unit advantageously calculates an energy value of a displacement from acceleration signals provided by the accelerometer, and compares this energy value with an energy threshold value stored in memory.

The energy threshold value can be adapted to the type of wing and the type of reference event expected for each wing. The energy threshold value may alternatively or in combination be stored in a memory of a device according to the invention from its first programming after manufacture.

Advantageously and according to the invention, the predetermined range of orientations is at most 5° around the reference orientation, in particular it is advantageously 2°.

Limits of the predetermined range of orientations are calculated and/or stored according to the reference orientation. For example, the lower and upper limits are respectively calculated by subtraction and addition of a stored value from or to the reference orientation. In practice a single limit is calculated when the wing opens on only one side of a frame.

In a second embodiment, alternative to or combined with the first embodiment, advantageously and according to the invention, the processing unit is adapted to be able to identify a reference event in which:
    the orientation signals are representative of a first instantaneous variation in orientation of the movement detector of large amplitude in a first direction, then
    the orientation signals are representative of a second instantaneous variation in orientation of the movement detector of large amplitude in a second direction opposite the first direction, then
    an acceleration energy of the movement detector is greater than a predetermined energy value.

Such a scenario corresponds to a characteristic opening then a complete closing of a wing relative to a frame. Such criteria for the detection of a reference event are thus particularly reliable and allow the reference orientation of the detector (thus of the wing) to be reliably reset.

Advantageously, a device according to the invention is also characterised in that the accelerometer is a three-axis accelerometer adapted to provide, as acceleration signals, data representative of instantaneous acceleration measurements of the housing in a terrestrial reference system. In particular the accelerometer or the processing unit for processing the accelerometer signals correct the influence of the acceleration of the Earth's gravity.

More particularly, the accelerometer is a three-axis accelerometer adapted to provide, as acceleration signals, data representative of instantaneous acceleration measurements of a wing to which the housing can be fixed.

Advantageously and according to the invention, the magnetometer is a three-axis magnetometer adapted to provide orientation signals representative of the instantaneous orientation of three fixed directions of the housing relative to the direction of the Earth's magnetic north.

A three-axis magnetometer enables detection of the orientation of a wing pivoting about any axis of a terrestrial reference system. Such a magnetometer enables detection of the orientation of a wing relative to the Earth's magnetic north, more precisely relative to the Earth's local magnetic north which may be slightly different from the Earth's magnetic north due to local disturbances of the magnetic field. Such a sensor is particularly suited for wings mounted rotatably about a vertical axis. However, it also enables detection of the orientation of a wing pivoting about a horizontal axis relative to a frame, or about an axis inclined in any way relative to a frame.

The processing of the orientation signals of the magnetometer indicating the orientation of the housing of the movement detector relative to the Earth's local magnetic field enables deduction of the angular position of a wing to which said housing is fixed relative to a known reference angular position which corresponds to a stored orientation of the wing relative to the Earth's local magnetic field.

Moreover, the magnetometer is advantageously a miniature magnetometer, for example of the magnetometric integrated circuit type. Similarly, the accelerometer is advantageously miniaturised.

Advantageously and according to the invention, the housing of the movement detector comprises means for fixing to a wing. The means for fixing are particularly adapted so that the detector can be mounted completely integrally with the wing—that is to say fixed relative to the wing—so as to be able to detect accelerations and changes in orientation of the wing.

The means for fixing the housing to a wing are adapted so that a change in orientation from at least one fixed direction of the wing relative to a frame can be detected by the movement detector. Similarly, the means for fixing the housing to a wing are adapted so that an acceleration of the wing according to at least one fixed direction of the wing can be detected by the movement detector, including shocks without movement of the wing.

More particularly, said housing comprises means for fixing to a wing such that the processing unit is adapted to be able to detect the removal of the movement detector from the wing required to move said housing with an acceleration and/or a change in orientation adapted, if necessary, to trigger an alarm; this in order to detect an attempt to break-in on the detector.

In addition, advantageously and according to the invention, the movement detector further comprises wireless signal transmitting means.

More particularly, the movement detector advantageously comprises wireless signal transmitting means according to a proximity wireless communication protocol, that is to say up to a maximum distance of less than 200 m, for example according to a Wifi communication protocol.

Advantageously, the movement detector further comprises wireless signal transmitting means according to a long-range wireless communication protocol, that is to say up to a maximum distance of greater than 200 m, for example according to a GSM, GPRS, UMTS communication protocol or an equivalent protocol sufficient for the implementation of the invention.

In addition, a movement detector according to the invention is advantageously provided with an autonomous energy source such as a battery and/or a photovoltaic cell for example. A movement detector according to the invention is advantageously wire-free and can thus be fixed freely and discreetly on any wing.

A movement detector according to the invention advantageously further comprises a memory adapted to be able to store data representative of the state of a wing. Thus, a movement detector according to the invention is adapted to store in memory the "closed", "open" and/or "moving" state of a wing.

Advantageously and according to the invention, the movement detector is adapted to be able to generate and wirelessly transmit signals representative of the orientation of the housing, in particular of a change in orientation of the housing relative to a previous state.

The processing unit of each movement detector is adapted to be able to transmit messages, named state messages, representative of the orientation of at least one monitored wing to which said movement detector is fixed. The state messages are more generally representative of the state of said wing relative to its frame. For example, the processing unit of the movement detector is adapted to send state messages representative of an "open" state, a "closed" state, or a "moving" state of the wing.

A device according to the invention is further advantageously characterised in that it comprises a central unit adapted to receive wirelessly signals transmitted by a movement detector. Such a central unit is especially adapted to be able to receive proximity wireless signals.

Thus, a plurality of movement detectors can be arranged in a premises to be monitored, and the central unit receives and processes state messages transmitted by each movement detector.

In some embodiments of the invention, each movement detector is adapted to be able to transmit directly signals forming state messages to a remote antenna of a long-range telecommunication network. This variant is useful in particular when the home automation device according to the invention does not have a central unit.

Advantageously, the processing unit and the central unit each comprise at least one programming memory containing operating instructions.

A programming memory according to the invention is adapted so that the central unit can operate in a plurality of operating modes.

In particular, advantageously and according to the invention, the central unit is adapted to be able to operate in a first operating mode, named passive mode, in which messages received from the movement detectors are processed.

In the case of a home automation device with an alarm against intrusions and break-ins, the passive mode corresponds to an operating mode without monitoring and without triggering alarm means.

Also, advantageously and according to the invention, the central unit can also advantageously be adapted to be able to operate in a second operating mode, named active mode, in which the central unit can activate alarm means, depending on results of processing the messages received from movement detectors and/or other detectors with which it is in communication. In active mode the central unit is adapted to be able to detect an intrusion and/or break-in event.

In the case of a home automation device with an alarm against intrusions and/or break-ins, the active mode corresponds to a monitoring operating mode with triggering of alarm means in the case of detection of an intrusion/or break-in event. The central unit may for example be adapted to transmit a signal for triggering an alarm siren, to transmit an alert message to a user and/or a remote monitoring company, to transmit signals for triggering other devices (door closers, switching on video surveillance, activation of a tear-gas dispenser, . . . ), etc.

In active mode, the central unit is advantageously adapted to be able to identify an intrusion and/or break-in event, upon receiving a message representative of the detection of a shock transmitted by a movement detector. A shock is detected by the processing unit of a movement detector when a movement energy value (calculated from the acceleration values) is greater in absolute value than a stored predetermined value. WO2007048908 presents examples of methods for processing the acceleration signals of the accelerometer which can be implemented in the context of the present invention.

Alternatively or in combination, the central unit is adapted to be able to identify a break-in event when, in active mode, it receives from a movement detector a message representative of a change in orientation of the detector.

Alternatively or in combination, the central unit is adapted to be able to identify a break-in event when, in active mode, it receives from a movement detector a message representative of an instantaneous orientation distinct from a reference orientation of a monitored wing.

Thus, a home automation device according to the invention is able to detect the rapid movement of a monitored wing, or shocks applied thereto—which is not the case of devices comprising only a magnetometer. Such is the case of a wing which is subjected to a break-in or unauthorised opening. However, a home automation device according to the invention is also able to detect a slow unauthorised opening (below the accelerometric detection threshold) owing to the presence of the magnetometer—which is not the case of devices comprising only an accelerometer.

Advantageously and according to the invention, the central unit comprises at least one memory adapted to be able to store data representative of the state of each monitored wing. For example, the data stored in such a memory can be representative of an "open" or "closed" state of the wing. The data representative of the state of a monitored wing is capable of being modified upon receipt of a message transmitted by a movement detector.

Thus, advantageously and according to the invention, if, when switching from a passive mode to an active mode of the central unit, the latter receives at least one signal representative of the fact that a wing is not in its reference orientation (e.g. "closed"), the central unit transmits an information signal. Such an information signal can be transmitted to a user interface (screen, loudspeaker, . . . ) and/or terminal (telephone, control panel of the home automation device, . . . ). Thus, a device according to the invention makes it possible for example to warn a user that a window of his/her home is still open when he/she is leaving his/her home and activates his/her alarm home automation device.

In addition, advantageously and according to the invention, the central unit can, on request from a user, transmit an information message containing the state of all wings monitored by movement detectors that can communicate with the central unit.

Advantageously, the processing unit of a movement detector operates identically regardless of the operating mode (passive/active) of the central unit.

For purposes of simplicity and economy, a movement detector according to the invention can be adapted to only transmit wireless signals, without being able to receive them.

Alternatively, a movement detector according to the invention can be adapted to communicate in transmission and in reception—in particular with the central unit—and transmit signals on receiving a request—in particular transmitted by the central unit. Thus, a movement detector can for example transmit orientation information of the wing to which it is fixed, at the request of the central unit.

Furthermore, advantageously and according to the invention, a processing unit is adapted to not generate a particular message for a sudden variation of short duration of the orientation of the detector without exceeding a predetermined acceleration value. Such a function makes it possible to filter and to ignore sudden variations in magnetic field due for example to the supply of an electrical circuit located nearby, the passage of a magnet, etc.

On the other hand, the processing unit is adapted to be able to detect a lasting variation in the Earth's local magnetic field by storing this new magnetic field in addition to the magnetic field detected during a configuration of the detector. More particularly, the processing unit is adapted to detect a small variation in the Earth's local magnetic field distinctly from a small and slow variation in the position of a wing.

Advantageously and according to the invention, each movement detector comprises a processing unit disposed in the detector housing.

The central unit is advantageously adapted to be able to process signals received from the movement detectors.

Advantageously, a home automation device according to the invention comprises at least one central unit and a plurality of movement detectors according to the invention.

The invention also extends to a method implemented in a device according to the invention. It also extends to a method for enhancing the reliability of detecting the movement of a wing rotatable about an axis relative to a frame fixed in a terrestrial reference system, by a home automation device comprising:

at least one movement detector comprising:
  a housing adapted to be securable to the wing,
  an accelerometer fixed to the housing and adapted to provide signals, named acceleration signals, representative of the acceleration of the housing along at least one fixed direction of the housing relative to the frame,
  a magnetometer fixed to the housing and adapted to provide signals, named orientation signals, representative of the instantaneous orientation of at least one fixed direction of the housing relative to an Earth's local magnetic field,
a processing unit for processing the signals provided by the accelerometer and by the magnetometer,
in which method:
a predetermined orientation value, named reference orientation, of the housing relative to the Earth's local magnetic field is stored,
the acceleration signals at least are processed by the processing unit, the processing unit being adapted to be able to identify a predetermined event, named reference event, from said acceleration signals,
on detection of a reference event, the instantaneous orientation of the housing is stored as a reference orientation.

More particularly, the processing unit identifies a reference event based on an acceleration energy calculated from said acceleration signals.

The processing unit identifies a reference event based on an acceleration energy and a defined orientation of the wing from said orientation signals. More particularly, the processing unit identifies a reference event based on an acceleration energy and a variation in orientation of the wing.

More particularly, the reference orientation is reset upon detection of a reference event comprising:
- an acceleration of the housing of said detector corresponding to a shock transmitted to said housing,
- an orientation of the detector within a predetermined range around the stored reference orientation.

Alternatively, the reference orientation is reset upon detection of a reference event comprising:
- a first instantaneous variation in orientation of the movement detector of large amplitude in a first direction, then
- a second instantaneous variation in orientation of the movement detector of large amplitude in a second direction opposite the first direction, then
- an acceleration energy value of the movement detector greater than a predetermined energy value.

Furthermore, advantageously, in a method according to the invention, the processing unit generates messages representative of the orientation of the wing, which are transmitted wirelessly by said movement detector.

In a method according to the invention, the messages can be transmitted according to a short-range communication protocol—for example to a central unit—and/or according to a long-range communication protocol.

The invention also relates to a device and a method characterised in combination by all or some of the features mentioned above or below. The invention particularly relates to a device adapted to implement a method according to the invention, and a method that can be implemented by a device according to the invention.

Figure 4:
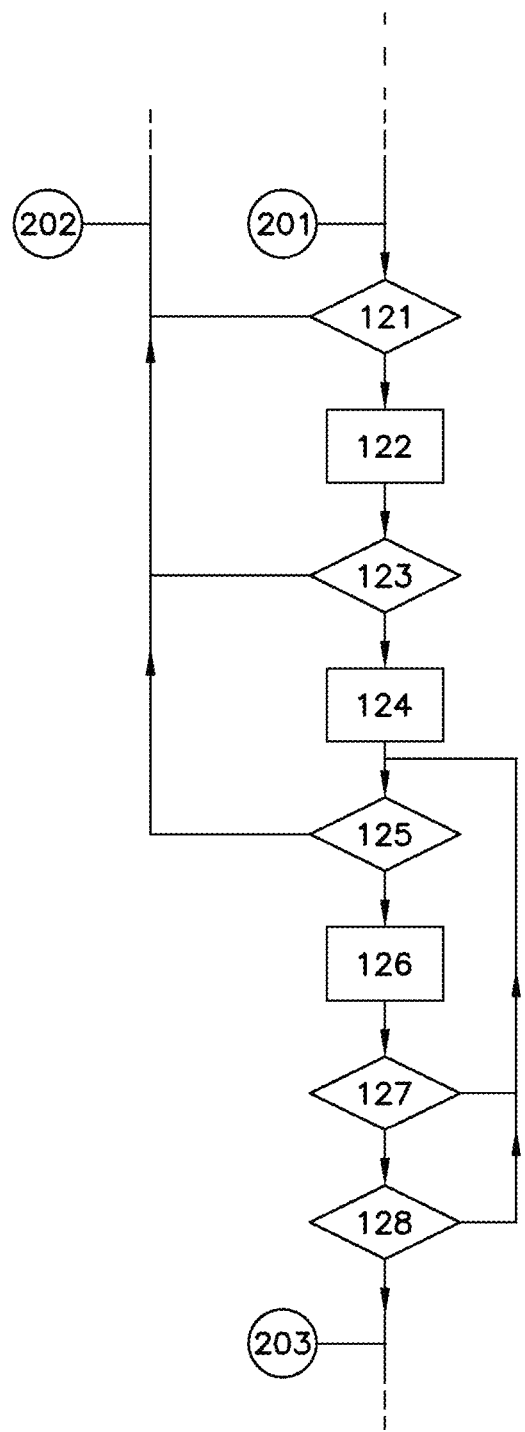

Other objects, features and advantages of the invention will become apparent on reading the following description given by way of nonlimiting example and which refers to the appended figures in which:

FIG. 1 is a schematic representation of a movement detector according to the invention in longitudinal section according to one embodiment of the invention, FIG. 2 is a schematic representation of a place in which a home automation device according to the invention is installed, FIG. 3 is a functional block diagram of one embodiment of a method according to the invention, FIG. 4 is a detailed functional block diagram of step 113 of the diagram of FIG. 3.

A device according to the invention comprises at least one movement detector 20.

A particular embodiment of such a movement detector 20 is shown in FIG. 1. It comprises a housing 22 having means 27 for fixing to a wing. In the example provided, the means 27 for fixing shown are adhesive tapes. There is nothing to prevent the provision of other means for fixing alternatively or in combination, such as screws.

The movement detector 20 comprises a three-axis accelerometer 24 mounted integral with the housing 22 and a three-axis magnetometer 25 mounted integral with the housing 22. The accelerometer 24 and the magnetometer 25 are electrically connected to the processing unit 21 for processing the signals from said accelerometer 24 and said magnetometer 25. The processing unit 21 comprises a memory 23 and a processor 28 to which the accelerometer 24 and the magnetometer 25 are connected. The processor 28 is electrically connected to the memory so as to be able to extract data therefrom, in particular instruction data, and to be able to store data therein, for example data, named reference orientation data, representative of a predetermined orientation value, named reference orientation, of the housing 22 relative to the Earth's local magnetic field.

The processor 28 is also electrically connected to two transmitters/receivers 26, 32 adapted to be able to at least transmit signals 37, 38 wirelessly. A first transmitter/receiver 26 is adapted to send short-range radiofrequency signals 37, for example according to a Wi-Fi, Bluetooth®, Bluetooth® Low Energy, etc., standard. A second transmitter/receiver 32 is adapted to send long-range radiofrequency signals 38, for example according to a GSM, GPRS, UMTS, etc., standard.

The movement detector 20 is autonomous in energy and comprises a battery 29 electrically connected to all the elements 21, 24, 25, 26, 32 of the movement detector requiring a power supply (electrical connections with the battery 29 not shown in FIG. 1).

Said home automation device according to the embodiment shown in FIG. 2 is a monitoring device (or alarm system) installed in a room 33. It comprises a plurality of movement detectors 20 in accordance with the invention.

Each movement detector 20 can wirelessly send messages to remote relay antennas 36 via the long-range transmitter/receiver 32.

This home automation device further comprises a central unit 35 adapted to be able to receive wireless signals 37 transmitted by each short-range transmitter/receiver 26 of each movement detector 20. The central unit 35 is itself adapted to be able to transmit signals wirelessly to other devices, for example to an alarm loudspeaker 34. The central unit 35 is advantageously connected to a public digital network such as the Internet, for example via a wireless connection of the Wi-Fi or Ethernet type through a home server with access to the Internet. The central unit 35 is advantageously adapted to be able to transmit messages via the Internet to a user interface which is itself connected to the Internet. The central unit 35 is also adapted to receive requests via the Internet.

Furthermore the central unit comprises an internal memory adapted to be able to store information relating to the state of each monitored wing. Advantageously, said internal memory is further adapted to store information relating to the nature of each monitored wing.

The central unit 35 is further adapted to be able to operate in at least two modes: a first mode, named passive mode, in which the alarm system is not activated, and a second mode, named active mode, in which the alarm system is activated. Upon the switching of the central unit 35 from a passive mode to an active mode, said unit checks the state of each monitored wing, stored in its internal memory, and generates or does not generate a message to a user interface according to said state of each monitored wing.

Thus, for example, in the situation shown in FIG. 2, a door 30 equipped with a movement detector 20 according to the invention is in the open position. If a user activates the central unit 35 in an active mode, said unit transmits an information message to a user interface (screen, loudspeaker, . . . ) and/or terminal (telephone, control panel of the home automation device, . . . ). The information contained in the message is that at least one of the monitored wings is not in its reference orientation; or more precisely, the invention may be such that the information contained in the message is that said door 30 is not closed.

When it is in active mode, the central unit 35 is adapted to trigger alarm means and/or transmit alert messages upon receiving messages from movement detectors containing information that a monitored wing subjected to shocks has moved or is being moved relative to its reference orientation.

Thus in FIG. 2 a door 30 equipped with a movement detector 20 is shown in an open position distinct from its reference orientation which is a closed position relative to a frame 39 which is a wall. Similarly, a window 31 equipped with a movement detector 20 is shown in the closed reference orientation.

FIG. 3 shows a method implemented in a movement detector 20 according to FIG. 1, equipped with a magnetometer 25.

The magnetometer and the accelerometer are advantageously miniaturised electronic components, for example of the type SM303D manufactured by STMicroelectronics, or MAG310 manufactured by Freescale.

The magnetometer 25 is mechanically fixed to the housing 22 so as to be integral therewith.

The magnetometer is a three-axis magnetometer which supplies signals representative of the projection value of the Earth's local magnetic field on each of three orthogonal axes. These measurements enable the processing unit to calculate the norm of the Earth's local magnetic field and to determine the angular orientation of the housing relative to the Earth's local magnetic field and therefore relative to a frame whose orientation is known (reference orientation), fixed in this Earth's local magnetic field.

At regular time intervals, for example every five seconds, the processing unit 21 of the movement detector 20 performs step 101. Step 101 corresponds to a passive monitoring of the orientation of a wing, sampled at a first frequency f1 (for example of the order of 0.2 Hz) making it possible to save energy consumed by the magnetometer and the processing unit.

In step 101 the instantaneous magnetic field strength (or norm) is compared with the reference magnetic field strength stored in memory 23, at the frequency f1. The strength is calculated by the processing unit from the measured values of the instantaneous Earth's local magnetic field on each of the three axes of said magnetometer. If the difference between the instantaneous magnetic field strength and the reference magnetic field strength is greater than a threshold value stored in memory 23, the processing unit 21 proceeds to step 102. The threshold value is chosen according to the sensitivity of the magnetometer and the margin of error in the calculation result of the magnetic field strength. The threshold value is for example about 70 mG.

In step 102 the instantaneous magnetic field strength is stored in memory and then compared with another value stored in memory 23, representative of the strength of a magnetic field produced by a powerful element. The stored value is for example of the order of 5 Gauss, i.e. about 10 times greater than the Earth's magnetic field. If the instantaneous magnetic field strength is greater than this stored value, the processing unit 21 proceeds to step 104.

In step 104, the processing unit transmits a message (via a transmitter/receiver 26, 32) to the central unit 35 informing it of the detection of the presence of a magnet near said movement detector 20 then returns to step 101. In some cases, if the central unit 35 is in active mode, this can be interpreted as a break-in and the central unit can then trigger alarm means and/or transmit alert messages.

If, in step 102, the instantaneous magnetic field strength is less than said stored value, the processing unit 21 proceeds to step 103.

In step 103, the variation of the magnetic field strength over time (between two samples) is compared with a threshold value stored in the memory 23. Said threshold value is for example about 20 mG. If the magnetic field strength varies significantly, the magnetic field is unstable and the processing unit returns to step 101.

If the magnetic field strength is stable, the processing unit proceeds to step 105. For, with the Earth's magnetic field strength being weak, the instantaneous magnetic field can be disturbed by metallic or electrical objects permanently installed near the movement detector 20.

In step 105, the new magnetic field is defined as the reference magnetic field, more particularly the strength and the three-dimensional orientation of the instantaneous Earth's local magnetic field are stored in the form of reference data in a memory. Thus the orientation and the norm of the instantaneous magnetic field replace stored values of a reference magnetic field. It is known that the Earth's local magnetic field has changed and that it is not the wing which has significantly moved, through the test of step 101 on the measured magnetic field strength: the movement of the wing does not change the strength (norm) of the measured magnetic field. After step 105, the processing unit 21 returns to step 101.

If, in step 101, the difference between the instantaneous magnetic field strength and the reference magnetic field strength is less than a threshold value stored in memory 23, it is because the wing has, a priori, changed orientation and the processing unit 21 proceeds to step 107.

In step 107, the processing unit 21 determines the instantaneous orientation of the housing relative to a reference orientation depending on the measured instantaneous value of the Earth's local magnetic field along each of the three orthogonal axes through the magnetometer 25.

In a series of steps of order n, the processing unit 21 stores in memory the instantaneous orientation of the monitored wing while maintaining in memory at least the instantaneous orientation determined in a series of steps of order n−1. The processing unit then proceeds to step 108.

In step 108, the processing unit compares the instantaneous orientation of the monitored housing 22 (and therefore of the monitored wing on which the movement detector is fixed) with a threshold value, named the margin of error, corresponding to the maximum error of determining the orientation of the housing by the processing unit from the orientation signals provided by the selected magnetometer. Said margin of error is for example chosen to be equal to 2° or 7°. If the instantaneous orientation of the monitored wing is less than this margin of error, the processing unit proceeds to step 109.

In step 109, the processing unit reads data stored in a rewritable memory of the device corresponding to the stored state of the wing. If the stored state is different from the "closed" state, the processing unit transmits a message to the central unit 35 informing it that the wing is in its reference orientation (corresponding for example to the "closed" state). The central unit 35 stores the state of said wing. The processing unit stores the new state of the wing.

In more detail, if the wing is being closed, at step 108, the margin of error is chosen to be 2° to ensure that the door has indeed been closed. If, however, the door is being opened, the margin of error is chosen to be 7° which is a minimum opening below which no one can pass through a standard wing (generally maximum width of 92 cm).

After step 109, the processing unit returns to step 101 at a frequency f1.

This is because an instantaneous orientation below said margin of error may correspond to a measurement error. Said margin of error is therefore determined according to the accuracy of the magnetometer and the calculations for obtaining an instantaneous orientation of the wing.

If, in step 108, the instantaneous orientation of the wing is greater than said margin of error, the processing unit proceeds to step 110.

In step 110, the processing unit transmits a message to the central unit 35 informing it that the wing is in a position distinct from its reference orientation (corresponding for example to the "open" state). The central unit 35 stores the state of said wing. The processing unit then proceeds to step 111. Moreover, if this were not yet the case, the processing unit 21 therefore acquires the data from the magnetometer at a second frequency f2 higher than the frequency f1. For example f2 is chosen to be of the order of 10 times greater than f1. For example, f1 is chosen to be equal to 0.2 Hz and the frequency f2 to be equal to 2 Hz.

In step 111, the processing unit compares the variation in orientation of the wing over time (between two successive measurements at the frequency f2) with respect to a predetermined threshold value. The threshold value is chosen for example to be of the order of 5°. If the orientation of the wing is stable (temporal variation of the orientation less than said threshold value), the processing unit proceeds to step 112.

In step 112, the processing unit reads data stored in a rewritable memory of the device corresponding to the stored state of the wing. If the stored state is different from the "open" state, the processing unit transmits a message to the central unit 35 informing it that the door is fixed in a position distinct from its reference orientation ("open" for example), and then returns to step 101 at the frequency f1. The central unit 35 stores the state of said wing. When the central unit 35 is in active mode, the receipt of such a message can be interpreted by the central unit as a break-in and the central unit then triggers alarm means and/or transmits one (or more) alert message(s) to a user and/or a remote monitoring company and/or police force. Thus, by virtue of the invention, even slow movement of a monitored wing can be detected; it can in particular be detected even in the absence of detection of acceleration of said wing beyond a certain threshold.

When the central unit 35 is in passive mode, the receipt of such a message may implement mechanisms for thermal management of a premises.

If, in step 111, the orientation of the wing is unstable (temporal variation of the orientation greater than said threshold value), the processing unit proceeds to step 113.

In step 113, the processing unit implements an algorithm for verifying the criteria for detecting a reference event. If these criteria are not verified, the processing unit returns to step 108.

If, in step 113, the criteria for detecting a reference event are verified, the processing unit proceeds to step 114.

In step 114, the processing unit resets the reference orientation of the monitored wing, that is to say it replaces the reference orientation data present in the memory 23 by data representative of the instantaneous orientation of the monitored wing, said instantaneous orientation having been determined in step 107. The processing unit then returns to step 101 at the frequency f1.

Thus, the use of a simple and cheap magnetometer based on the use of the Earth's local magnetic field as a reference is made possible by the invention, through the combination of a magnetometer and an accelerometer, and by regularly resetting a reference orientation of a monitored wing, based on detection of a known reference event for a wing.

The references 201, 202 and 203 represent the connections between the block diagram of FIG. 3 and a block diagram of FIG. 4 which details the step 113 of FIG. 3.

Thus if, in step 111, the orientation of the wing is unstable (temporal variation of the orientation greater than said threshold value), the processing unit proceeds in fact to step 121 (cf. FIG. 4 via the reference 201).

In step 121, the processing unit compares the instantaneous orientation of the wing with a predetermined value β corresponding to a significant opening of a wing—especially a passage of at least 20 cm allowing the passage of a person. The predetermined value β is for example of the order of 15°—allowing a passage of 20 cm in the case of a door 73 cm wide. If the instantaneous orientation of the wing is less than this predetermined value β, the processing unit returns to step 108 (cf. FIG. 3 via the reference 202).

If, in step 121, the instantaneous orientation of the wing is greater than said predetermined value, the processing unit proceeds to step 122.

In step 122, the processing unit 21 determines the direction of rotation of the wing according to its instantaneous orientation (stored value of order n) and the previously determined instantaneous orientation (stored value of order n−1). The processing unit then proceeds to step 123.

In step 123, the processing unit compares the direction of rotation of the wing with a predetermined direction, especially an opening direction. If it is thus determined that the monitored wing pivots in the direction of closing, the processing unit returns to step 108 (cf. FIG. 3 via the reference 202).

If, in step 123, it is determined that the monitored wing pivots in the direction of opening, the processing unit proceeds to step 124.

In step 124, the processing unit triggers a timer and proceeds to step 125.

In step 125, the processing unit compares the value of said timer with a predetermined time period value T1 stored in memory. The value T1 is for example chosen to be of the order of 3 seconds. If the time elapsed since the triggering of the timer is greater than said predetermined time period, that is to say the wing has not been closed again within a predetermined time period T1 from its opening, the processing unit returns to step 108 (cf. FIG. 3 via the reference 202).

If, in step 125, the time elapsed since the triggering of the timer is less than said predetermined time period T1, the processing unit proceeds to step 126.

In step 126, the processing unit 21 again determines the instantaneous orientation of the monitored wing. The processing unit 21 then proceeds to step 127.

In step 127, the processing unit determines the direction of rotation of the wing from the instantaneous orientation determined in step 126 (stored value order of order n) and the instantaneous orientation previously determined (stored value of order n−1). Then the processing unit compares the direction of rotation of the wing with a predetermined direction, especially an opening direction. If it is determined that the monitored wing pivots in the direction of opening, that is to say it continues to pivot in the same direction as in step 123, the processing unit returns to step 125.

If by contrast it is determined in step 127 that the monitored wing pivots in the direction of closing, that is to say it has changed pivoting direction since step 123, the processing unit proceeds to step 128. The wing has therefore been opened and is being closed.

In step 128, the processing unit triggers a timer and monitors the signals delivered by the accelerometer during a predetermined time period T2 while comparing the measured acceleration values on each axis of the accelerometer with a stored predetermined value. The time period T2 is for example chosen to be of the order of 2 seconds. There is nothing to prevent reducing this time period to 0 seconds, when the shock of closing the door is expected following its angular movement in the direction of closing.

Each predetermined value is chosen so that any measured value greater than said predetermined value in fact corresponds to a shock. If no measured value greater than a predetermined value—which corresponds to a shock—is detected in the time period T2, the processing unit returns to step 125.

If, in step 128, a shock is detected by the accelerometer in said predetermined time period T2 the processing unit proceeds to step 114 (cf. FIG. 3 via the reference 203). The shock normally corresponds to the closing of a wing 30, 31 on its frame 39. Thus the sequence of events consisting of the detection of an opening movement, followed by a closing movement and then a contact shock of the wing on its uprights constitutes a reference event.

A detection cycle based on the accelerometer signals is described in FIG. 3.

In step 115 the value of the acceleration along each axis of the accelerometer is compared with a reference value stored in memory 23, at a frequency f3. The frequency f3 is chosen to be of the order of 10 times greater than the frequency f1. The frequency f3 is for example of the order of 2 Hz. If none of the acceleration values along each axis of the accelerometer is greater than its stored reference value, the processing unit 21 continues its monitoring (step 115) at the frequency f3. Step 115 thus corresponds to a passive monitoring of the acceleration which a wing undergoes.

If, in step 115, the value of the instantaneous acceleration of the detector along at least one axis of said accelerometer is greater than a reference value stored in memory, the processing unit 21 proceeds to steps 107 and 116 in which it monitors at a higher frequency the angular position and accelerations of the monitored wing. The magnetometer data is then acquired at the frequency f2 and no longer at the frequency f1. The accelerometer data is then acquired at the frequency f4 and no longer at the frequency f3. For example, f4 is chosen to be of the order of 10 times greater than f3. The frequency f4 is for example of the order of 25 Hz.

In step 116, the processing unit performs a specific filtering of the signals received from said accelerometer 24, and then proceeds to step 117.

In step 117, the processing unit calculates the movement energy corresponding to the detected accelerations, and then proceeds to step 118.

In step 118, the processing unit 21 compares the movement energy calculated in step 117 along each axis of said accelerometer relative to a threshold value stored in memory 23. The threshold values are pre-stored in memory and may be modified by the processing unit during the use of a movement detector according to the invention to adapt each movement detector to the nature of the wing on which it is fixed. The threshold values are such that movement energies calculated along each axis of said accelerometer which are less than said threshold values correspond to accelerations or shocks considered normal for said monitored wing (e.g. small movements caused by the wind on a wing mounted with non-zero play).

If, in step 118, the movement energy is greater than a threshold value along at least one of the axes of said accelerometer, the processing unit proceeds to step 119.

In step 119 the processing unit 21 generates then transmits an alarm message to the central unit 35 informing it that the wing is undergoing significant accelerations. When the central unit 35 is in active mode, receiving such a message is interpreted by the central unit as an attempted break-in and the central unit then triggers alarm means and/or transmits one (or more) alert message(s). The processing unit 21 then returns to step 115.

Thus, even in the absence of detection of an angular movement of a monitored wing, or in case of malicious blinding of the magnetometer by a magnet, the detection of the acceleration of the wing continues to allow detection of break-in or theft.

The invention may have many other variant embodiments (not shown).

The invention may have home automation applications other than alarm systems. Thus, the invention makes it possible for example to know the position (open or not) of each wing of a building, which can be useful for example in the context of the thermal management or security (access control, fire management, etc.) of a building. Such management can also make it possible to ensure the safety of persons situated in a building (school, hospital, home, etc.), and/or to extract information about user behaviour in a building for example from the frequency of entering a room (WC, laboratory, etc.).

There is nothing to prevent, in a device according to the invention, each movement detector from being without a processing unit and each movement detector from comprising means of transmission of the acceleration signals and the orientation signals to a remote central unit comprising a unit for processing said signals in accordance with the invention.

The invention claimed is:
1. A home automation device comprising:
at least one movement detector (20) for detecting movement of a wing (30, 31) rotatable about an axis relative to a frame (39) fixed in a terrestrial reference system, said movement detector comprising:
a housing (22) adapted to be securable to the wing,
an accelerometer (24) fixed to the housing and adapted to provide acceleration signals, representative of the acceleration of the housing (22) along at least one fixed direction of the housing (22) relative to the frame (39),
a magnetometer (25) fixed to the housing and adapted to provide orientation signals, representative of the instantaneous orientation of at least one fixed direction of the housing (22) relative to an Earth's local magnetic field; and
a processing unit (21) for processing the signals provided by the accelerometer (24) and by the magnetometer (25), wherein,
the processing unit (21) comprises at least one memory (23) and is adapted to store therein predetermined reference orientation data, representative of a reference orientation, of the housing (22) relative to the Earth's local magnetic field,
the processing unit (21) is adapted to be able to identify a predetermined reference event, at least from the acceleration signals, and
the processing unit (21) is adapted, on detection of the predetermined reference event, to replace the reference orientation data with data representative of the instantaneous orientation of the housing (22).

2. The device according to claim 1, wherein the processing unit (21) is adapted to be able to identify the predetermined reference event from the acceleration signals and the orientation signals.

3. The device according to claim 1, wherein the processing unit (21) is adapted to be able to identify the predetermined reference event in which:
the orientation signals are representative of a first instantaneous variation in orientation of the movement detector (20) of large amplitude in a first direction, then
the orientation signals are representative of a second instantaneous variation in orientation of the movement detector (20) of large amplitude in a second direction opposite the first direction, then
an acceleration energy of the movement detector is greater than a predetermined energy value.

4. The device according to claim 1, wherein the accelerometer (24) is a three-axis accelerometer adapted to provide, as acceleration signals, data representative of instantaneous acceleration measurements of the housing (22) in a terrestrial reference system.

5. The device according to claim 1, wherein the magnetometer (25) is a three-axis magnetometer adapted to provide orientation signals representative of the instantaneous orientation of three fixed directions of the housing (22) relative to the direction of the Earth's magnetic north.

6. The device according to claim 1, wherein the movement detector (20) further comprises wireless signal (37, 38) transmitting means (26, 32).

7. The device according to claim 6, wherein the movement detector (20) is adapted to be able to generate and wirelessly transmit signals (37, 38) representative of the orientation of the housing (22).

8. The device according to claim 6, further comprising a central unit (35) adapted to receive wirelessly signals (37) transmitted by a movement detector (20).

9. A method for enhancing the reliability of detecting the movement of a wing (30, 31) rotatable about an axis relative to a frame (39) fixed in a terrestrial reference system, by a home automation device comprising:
at least one movement detector (20) comprising:
a housing (22) adapted to be securable to the wing,
an accelerometer (24) fixed to the housing and adapted to provide acceleration signals, representative of the acceleration of the housing along at least one fixed direction of the housing relative to the frame,
a magnetometer (25) fixed to the housing and adapted to provide orientation signals, representative of the instantaneous orientation of at least one fixed direction of the housing relative to an Earth's local magnetic field; and
a processing unit (21) for processing the signals provided by the accelerometer and by the magnetometer,
in which method:
a predetermined reference orientation, of the housing relative to the Earth's local magnetic field is stored,
the acceleration signals at least are processed by the processing unit, the processing unit being adapted to be able to identify a predetermined reference event, from said acceleration signals, and on detection of the predetermined reference event, the instantaneous orientation of the housing is stored as a reference orientation.

10. The method according to claim 9, in which the processing unit (21) generates messages representative of the orientation of the wing (30, 31), which are transmitted wirelessly by said movement detector (20).

11. The device according to claim 2, wherein the processing unit (21) is adapted to be able to identify the predetermined reference event in which:
the orientation signals are representative of a first instantaneous variation in orientation of the movement detector (20) of large amplitude in a first direction, then
the orientation signals are representative of a second instantaneous variation in orientation of the movement detector (20) of large amplitude in a second direction opposite the first direction, then
an acceleration energy of the movement detector is greater than a predetermined energy value.

12. The device according to claim 2, wherein the accelerometer (24) is a three-axis accelerometer adapted to provide, as acceleration signals, data representative of instantaneous acceleration measurements of the housing (22) in a terrestrial reference system.

13. The device according to claim 3, wherein the accelerometer (24) is a three-axis accelerometer adapted to provide, as acceleration signals, data representative of instantaneous acceleration measurements of the housing (22) in a terrestrial reference system.

14. The device according to claim 2, wherein the magnetometer (25) is a three-axis magnetometer adapted to provide orientation signals representative of the instantaneous orientation of three fixed directions of the housing (22) relative to the direction of the Earth's magnetic north.

15. The device according to claim 3, wherein the magnetometer (25) is a three-axis magnetometer adapted to provide orientation signals representative of the instantaneous orientation of three fixed directions of the housing (22) relative to the direction of the Earth's magnetic north.

16. The device according to claim 4, wherein the magnetometer (25) is a three-axis magnetometer adapted to provide orientation signals representative of the instantaneous orientation of three fixed directions of the housing (22) relative to the direction of the Earth's magnetic north.

17. The device according to claim 2, wherein the movement detector (20) further comprises wireless signal (37, 38) transmitting means (26, 32).

18. The device according to claim 3, wherein the movement detector (20) further comprises wireless signal (37, 38) transmitting means (26, 32).

19. The device according to claim 4, wherein the movement detector (20) further comprises wireless signal (37, 38) transmitting means (26, 32).

20. The device according to claim 5, wherein the movement detector (20) further comprises wireless signal (37, 38) transmitting means (26, 32).

* * * * *